US006829086B1

(12) United States Patent
Gibilini

(10) Patent No.: US 6,829,086 B1
(45) Date of Patent: Dec. 7, 2004

(54) PROJECTION SCREEN

(75) Inventor: Daniel Gibilini, Saint Martin d'Uriage (FR)

(73) Assignee: Synelec Telecom Multimedia, Saint-Sernin-sur-Rance (FR)

( * ) Notice: Subject to any disclaimer, the term of this patent is extended or adjusted under 35 U.S.C. 154(b) by 0 days.

(21) Appl. No.: 10/018,384

(22) PCT Filed: Apr. 28, 2000

(86) PCT No.: PCT/FR00/01156

§ 371 (c)(1),
(2), (4) Date: Apr. 17, 2002

(87) PCT Pub. No.: WO00/67071

PCT Pub. Date: Nov. 9, 2000

(30) Foreign Application Priority Data

Apr. 29, 1999 (FR) .............................. 99 05480
Jun. 10, 1999 (FR) .............................. 99 07352

(51) Int. Cl.⁷ ............................................. G03B 21/60
(52) U.S. Cl. ................. 359/453; 359/455; 359/456
(58) Field of Search ............................. 359/455, 456, 359/457, 452, 453

(56) References Cited

U.S. PATENT DOCUMENTS

| 3,523,717 | A | * | 8/1970 | Glenn, Jr. ................... 359/457 |
| 3,552,822 | A | * | 1/1971 | Altman ....................... 359/453 |
| 3,832,032 | A | | 8/1974 | Shimada |
| 4,666,248 | A | | 5/1987 | van de Ven ................. 359/457 |
| 5,448,401 | A | * | 9/1995 | Takuma et al. ............. 359/456 |
| 5,611,611 | A | | 3/1997 | Ogino et al. |
| 5,668,662 | A | * | 9/1997 | Magocs et al. ............. 359/452 |
| 5,745,288 | A | | 4/1998 | Miyata et al. |
| 5,870,224 | A | | 2/1999 | Saitoh et al. |
| 5,999,281 | A | * | 12/1999 | Abbott et al. ............... 359/460 |
| 6,049,423 | A | * | 4/2000 | Okuda ........................ 359/453 |
| 6,185,038 | B1 | * | 2/2001 | Yamaguchi et al. ........ 359/457 |
| 6,278,546 | B1 | * | 8/2001 | Dubin et al. ................ 359/456 |
| 6,295,162 | B1 | * | 9/2001 | Miyata ....................... 359/453 |

FOREIGN PATENT DOCUMENTS

| EP | 1 014 169 | 6/2000 |
| FR | 959 731 | 4/1950 |
| FR | 972 333 | 1/1951 |
| FR | 980 402 | 5/1951 |
| FR | 1 266 832 | 11/1961 |
| GB | 389 611 | 3/1933 |
| GB | 1 440 016 | 6/1976 |
| JP | 3-127041 | 5/1991 |
| WO | WO 9607953 A1 | 3/1996 |

* cited by examiner

Primary Examiner—Christopher E Mahoney
(74) Attorney, Agent, or Firm—Kenyon & Kenyon

(57) ABSTRACT

The invention concerns a rear projection screen, comprising a support (22) with focusing elements such as microlenses (26) or lenticular elements, a holographic diffuser, and an opaque layer (36) with apertures (38) for allowing through the light focused by the microlenses. The light projected from the rear of the screen is concentrated by the microlenses (26) and passes through the opaque layer by the apertures (38). The holographic diffuser controls the directivity of the light. The incident light on the screen is absorbed by the opaque layer, such that the layer provides good transmittivity, high contrast, and controlled directivity owing to the holographic diffuser. The invention also concerns a method for making such a rear projection screen whereby the apertures in the opaque layer are formed by irradiating said layer or a preparatory material through the microlenses.

11 Claims, 3 Drawing Sheets

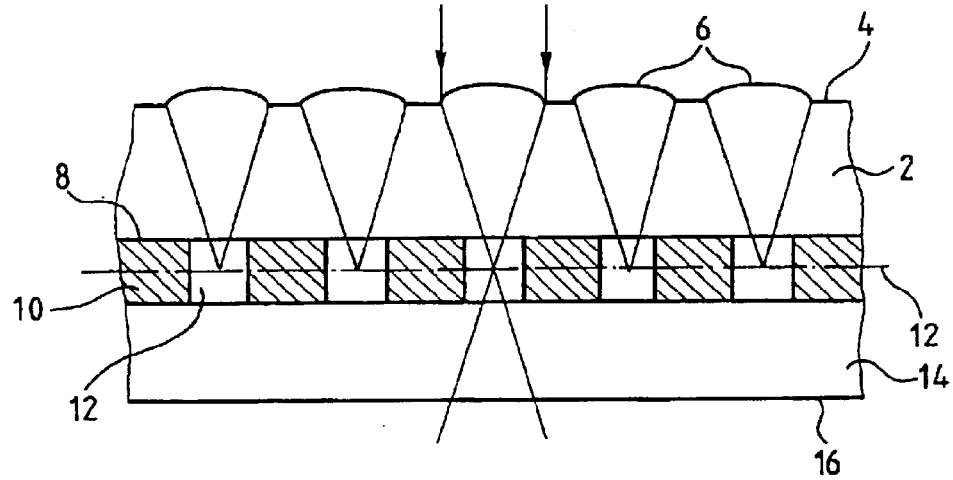
FIG_1
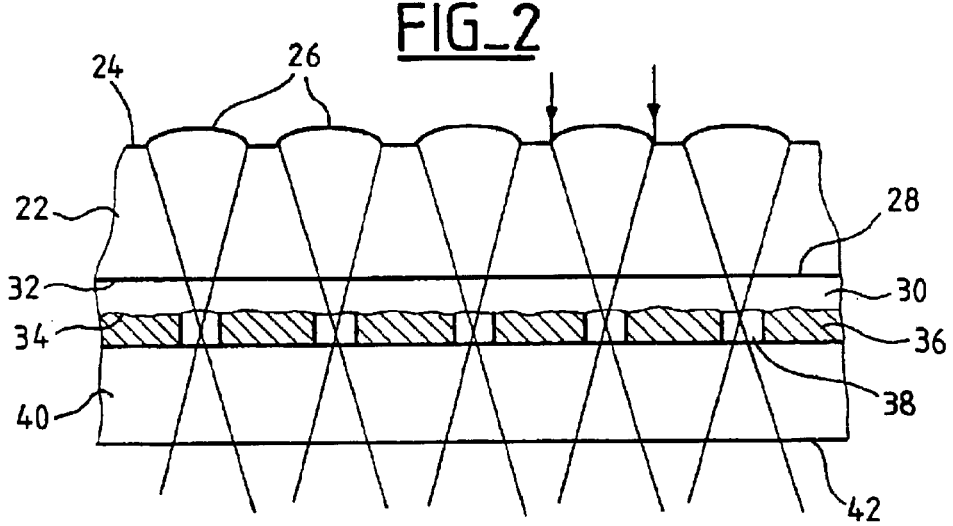
FIG_2
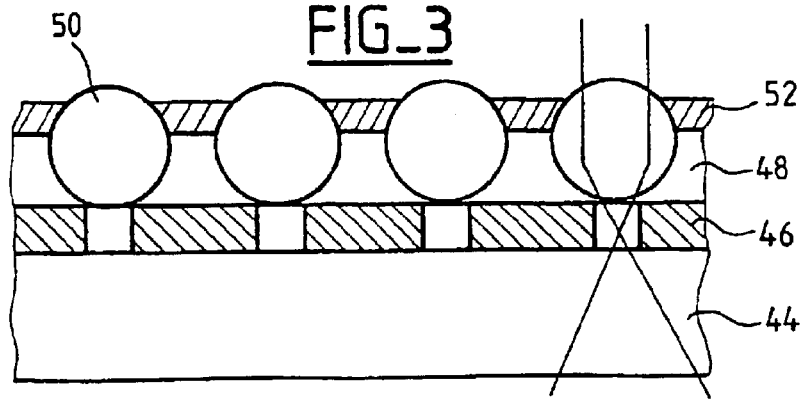
FIG_3

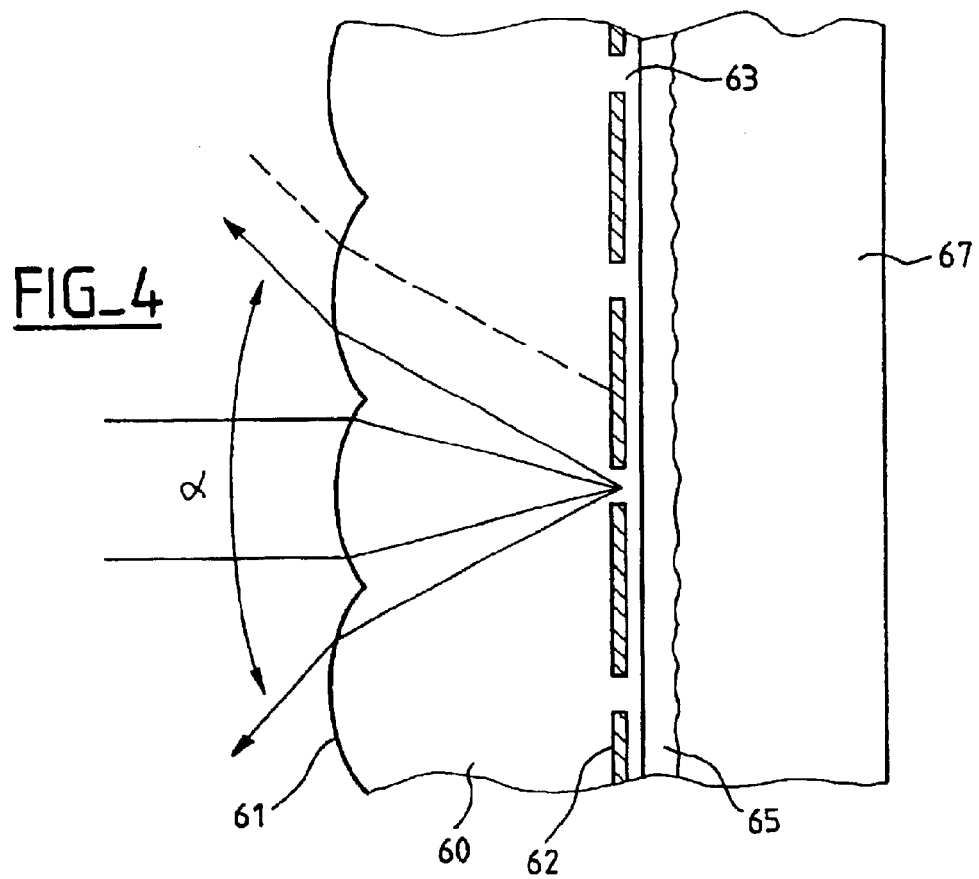
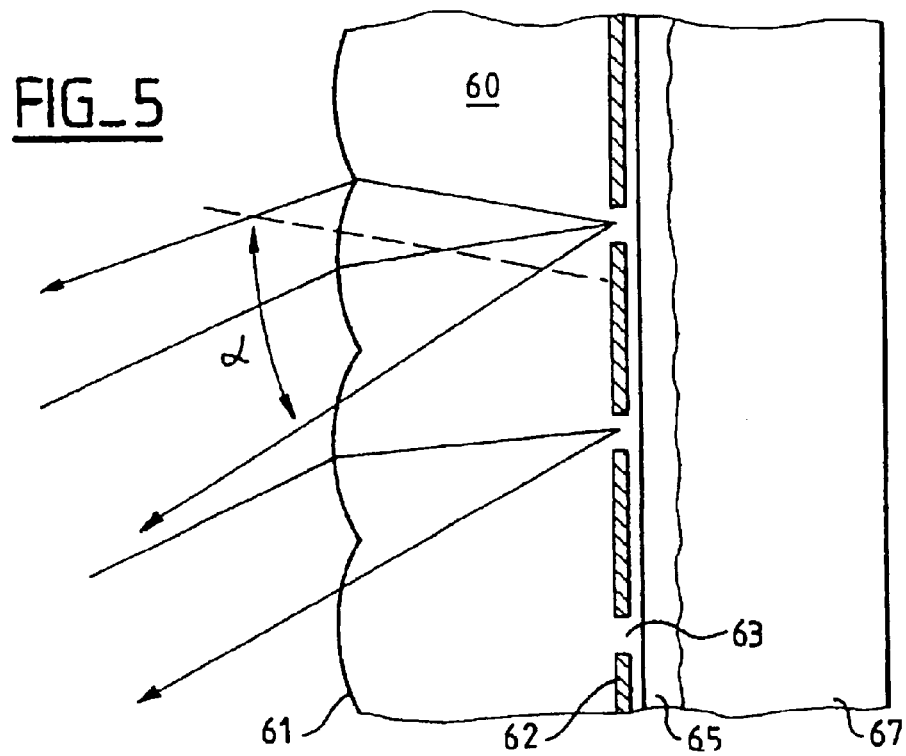

FIG_6
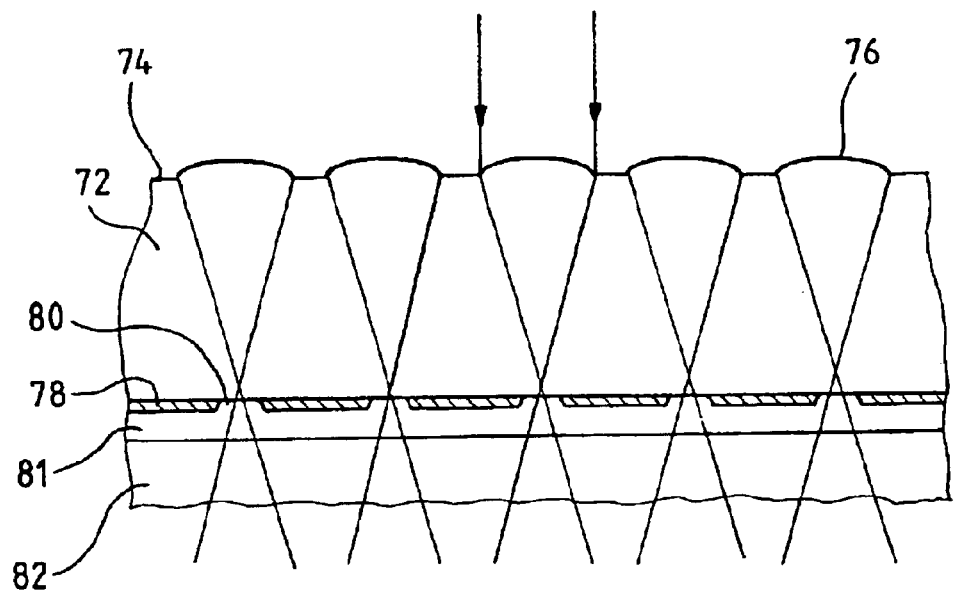
FIG_7
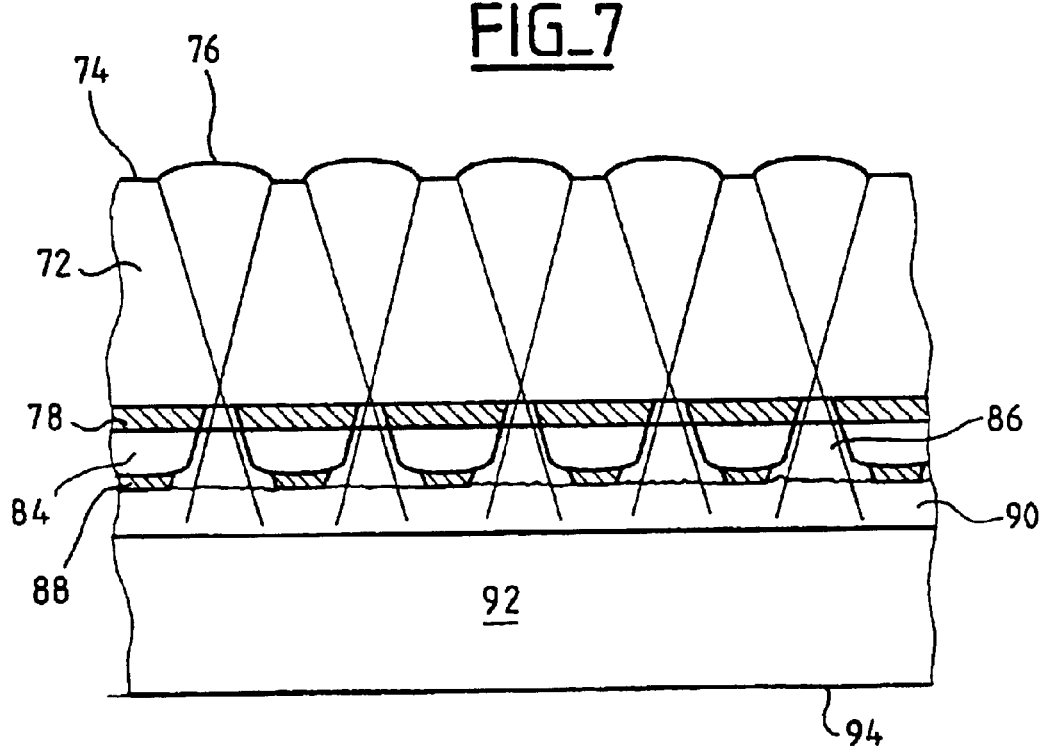

PROJECTION SCREEN

This application is a 371 of PCT/FR00/01156 filed Apr. 28, 2000.

BACKGROUND OF THE INVENTION

The present invention relates to the projection field, and more specifically concerns screens used both for front and for rear projection. Front projection is the projection of an image onto one side of a screen which by convention will be called hereinafter the front of the screen, for displaying images on the front of a screen. In the current state of technology, this type of projection is done in a darkened room, the conventional example being projection onto glass bead cinema screens.

Rear projection is projection of the picture onto one side of a screen which will be called by convention hereinafter the back of the screen for displaying images on the other side of the screen, which by convention will be called the front of the screen. Such screens are notably used for large scale projection or so-called picture walls; these screens, when they have sufficient contrast, are used in a normally lit theatre. As the projector, conventional analog projectors such as those of the 3-tube type can be used or one can also use, as is done in the equipment currently marketed by the applicant, digital devices such as the digital Micro-Mirror devices sold by Texas Instruments known as the DMD. Rear projection screens can also be used in other applications, for example as a screen for filtering a collimated or slightly divergent light, i.e. with an angle of divergence less than or of the order of 20°. Such screens can be used in signs for highways, or as directional filters on cathode ray tubes.

The ideal properties of a rear projection screen are as follows:

good luminescence or transmitivitty, in other words an ability to transmit light forwardly of the screen so that projected pictures are effectively displayed to the public, and that they are not at all or only slightly reflected back to the projector or absorbed by the screen;

high light absorption in the front to back direction so that ambient light is not reflected towards the public at the same time as the light projected from the back;

good resolution, in other words the ability to distinguish two projected points that are close to each other; controlled directivity, in other words the possibility of controlling the solid angle within which the rays passing through the screen are delivered; from this point of view, one can generally define a gain for the screen by comparing its characteristics with those of a diffusing reflector screen formed from a magnesium oxide layer on a backing support.

The ideal properties of a projection screen are substantially the same:

an ability to reflect light projected onto the front of a screen towards the public so that projected pictures are effectively reflected towards the public and are not or only slightly absorbed by the screen;

good resolution, in other words the ability to distinguish two projected points that are close to each other;

good resolution, in other words the ability to distinguish two projected points that are close to each other; controlled directivity, in other words the possibility of controlling the solid angle within which the rays passing through the screen are delivered; from this point of view, one can generally define a gain for the screen by comparing its characteristics with those of a diffusing reflector screen formed from a magnesium oxide layer on a backing support.

In the current state-of-the-art, projection screens are only used in a darkened hall, and the behaviour of the screen as regards ambient light is not a property that is considered.

Conventionally, the nominal contrast of a rear projection screen is defined as the ratio $L0/(l \times R)$ between the light $L0$ delivered by the screen and the product of the light l incident on the screen and the reflection R of the screen. This definition applies both to projection as well as to rear projection. In the case of rear projection, a reflection that is too high of light in a backward sense decreases the contrast of a projected image and can prevent the screen being used other than in a darkened room; as the rear projector is a box, rear projection tolerates minimal ambient lighting unlike front projection. This obviously creates a problem for applications such as control rooms or outdoor applications such as for example projection in sports stadiums.

Various rear projection screens have been proposed. The oldest and simplest solution is to use a frosted glass screen. A screen formed by a plate of frosted glass with a pitted surface constituting a Lambert frosting, with isotropic light scattering: the transmissivity of such a screen is consequently 50% and its gain is 1. Its front-to-back reflection is of the order of 10% which makes the use of frosted glass difficult under ambient light conditions. The Stewart Film Screen Corporation offers improved frosted glass screens having an oval-type forward gain and non-isotropic forward light scattering. Transmissivity is still around 50% but in the direction of use of the screen, gain is better than unity. Briefly, these frosted glass screens have high resolution but low contrast, which is typically of the order of 10. The company HIP is proposing screens formed from a thin film diffuser on a transparent substrates on which black dots embedded in the diffusing thin-film are deposited; these black dots reduce light reflection and increase screen contrast; nevertheless they also lower transmissivity and lead to information loss. Transmissivity is of the order of 50% and contrast typically between 50 and 100.

It is also known, for television applications, to provide a screen with a lenticular structure. Such screens have a wavy structure in a horizontal direction, unvarying by translation in the vertical direction. The waviness allows spreading of light horizontally thereby increasing viewing angle in this direction. The inclusion of diffusing cores such as diffusing bubbles inside the material has also been proposed to ensure controlled scattering in the vertical direction as well as in the horizontal direction: viewing angle in the vertical direction remains reduced and is in any case linked to bubble concentration; the use of such bubbles decreases screen resolution. Maximum resolution is fairly low in view of the minimum size of the wavy patterns which is of the order of 0.3 mm. With a wavy pattern size of the order of 0.8 to 1 mm, such screens are generally used for video. For high resolution graphic applications, such screens pose local or whole screen moiré patterning problems.

Such a screen is disclosed in European patent application 0,241,986; in this document, a black matrix is deposited between the undulations in order to improve contrast; this black matrix has the disadvantage of absorbing a part of the information. Transmissivity of such screens is of the order of 55% and contrast around 100. Dai Nippon Printing and Philipps offer such screens. At the SIG 99 (Symposium of international display) held at San José, Calif. from May 16 to 20, 1999, Dai Nippon Printing presented a new lenticular screen having a layer absorbing ambient light applied directly to the outer cylindrical surface of the undulations; claimed improvement over the previous product is as follows:

|  | tinted screen | New screen |
|---|---|---|
| Optical transmission | 54% | 57% |
| Return R of ambient light | 11% | 6%. |

Screen contrast and brightness remain pretty average.

J. L. Tedesco et al, Holographic Diffusers for LCD 9–32, mentions, for rear projection applications, the use of a screen formed from a Fresnel lens, a conventional diffuser and a lens matrix. The Fresnel lens forms an image of the lens aperture in a mid portion of the image space. The diffuser provides a limited diffusion of the image in the vertical direction and the lens matrix ensures image spreading in the horizontal sense. At the SIG 99, Sarnoff Corporation presented a new improved black matrix lens-structure screen without however stating how the black matrix had been improved; contrast appears good at but brightness remains fairly average in view of a transmission which at the best is 60%.

Briefly such lens-structure screens have low resolution, fairly average brightness, poor horizontal directivity but pronounced vertical directivity and heigh contrast if the black matrix is present significantly; however, in this latter case, a deterioration of brightness is present.

Physical Optics Corporation is selling, under the DDS (digital display screen) brand screens intended for rear projection or for television or computer screens. The screens are formed on a tinted polycarbonate, polyester or acrylic support onto which a holographic diffuser is bonded. The holographic diffuser is of the type disclosed in U.S. Pat. No. 5,609,939, and allows viewing angle to be controlled in other words the solid angle within which the light projected onto the screen is transmitted. Such screens resolve the problem of directivity; nevertheless, the tinted acrylic screen proposed for rear projection applications has poor brightness in view of the transmissivity which is only around 50%. All in all, such screens have good resolution, effective control of directivity in the horizontal direction as well as vertically; contrast and transmissivity remain poor notably in view of the use of a tinted material incorporated into the body of the screen; the transmission of such material is too poor to ensure good brightness and yet again too high to ensure good contrast. A contrast of the order of 50 is habitually encountered. Other suppliers of transmissive holographic films are Denso (Japan) or the Institut National d'Optique (INO, Canada). Holographic films are supplied by Physical Optics Corporation or by the US company Krystal Holographics International Inc.

The above article by J M Tedesco et al proposes associating a holographic diffuser and a Fresnel lens to overcome the problems posed by lens matrixes. U.S. Pat. Nos. 5,781, 344 and 5,563,738 disclose low reflectance filters of the type currently used by the applicant for rear projection products. These filters consist of a support, an opaque matrix and balls which are impressed into the opaque matrix so as to come into contact with the support. Light originating from the projector is focused by the balls, and only passes through the opaque matrix when it passes the point of contact between the balls and the support or close thereto. For adjusting optical properties of the filters, these documents suggest providing, above the opaque matrix, at the side of the balls, one or several supplementary layers, between the balls or above them. To improve contrast by decreasing the amount of light passing between the balls, it is proposed, in this document, to deposit an opaque layer above the opaque matrix. This layer can for example be created by depositing a pigment in powder form and then heating the filter until the pigment diffuses into the upper portion of the opaque matrix.

This filter has a high resolution in view of the small size of the balls and their closeness. Nevertheless, the filling ratio of the rear surface by the balls is hardly 70%, which reduces brightness. A transmissivity of the order of 50% and contrast of the order of 200 is typically achieved.

Mems Optical Corporation and RPC (USA) are proposing micro-lens arrays. The micro-lenses are obtained by lithography using ion etching as for example described in international application WO-A-9832590. The micro-lenses are 10–2000 microns in size and are arranged regularly in a circle on hexagons, squares or rectangles. Such micro-lenses are not used for rear projection applications.

The Polaroid Corporation presented, at SIG 99, a display dedicated exclusively to LCD (liquid crystal display) projection. This is a diffuser with a linear polarising film; in the LCD cell, a single linear polariser is not useful, crossed with the polariser of the display. Ambient light passes through the display polariser and is back-scattered by the diffuser and consequently is absorbed when again passing through the display polariser.

British patent application 389,611 discloses a projection screen the rear surface of which, i.e. the surface on which the projector light is thrown, is formed from a large number of focusing optical systems. These focus light originating from a source at infinity towards apertures provided in a black layer. It is suggested to form these apertures in the black layer by depositing a photographic film on the rear surface of the screen, exposing the screen and developing the photographic film. By bonding a transparent material having surface irregularities or a semi-transparent material on the front face of the screen above the black layer, the screen can be used in daylight. In one embodiment, the focusing optical systems of the rear surface are formed by super-positioning two arrays each comprising cylindrical lenses.

The use of a semi-transparent or cloudy material considerably decreases display contrast as a not-insignificant part of the ambient light (30–40%) is back-scattered towards the user. Using surface irregularities in a transparent material as the diffuser also reduces contrast. This results in the contrast of the proposed display in that document being below 100.

British patent application 1,440,016 discloses a projection screen of the same type. In that document, it is proposed to provide, on the front face of a focusing element support, a black layer and to provide apertures therein, and to provide a diffusing material in these apertures. There is nothing in that document that teaches how to form the diffusing material in the apertures of the black layer.

It is difficult for the screens proposed in these two documents to control display directivity, in other words the orientation of the light rays leaving the display. Additionally, these displays cannot provide good contrast at the same time as a front face having a shiny appearance. The screens disclosed in these documents additionally suffer from significant aberration.

U.S. Pat. No. 4,666,248 discloses a rear projection screen having a transparent layer and, on the back of the screen, an absorbent layer having apertures and a layer of anamorphic lenses. This document states that around 75% of the intermediate layer is absorbent. French patent application serial number 980,402 relates to a projection screen using transparency, in other words a rear projection screen. This screen has two sets of cylindrical lenses with offset axes or lenticular elements formed by the intersections of said cylindrical lenses. On the other face opposite the lenticular elements, an opaque layer is formed with apertures using a photographic printing process. The major portion of this layer is opaque. French patent application serial number 972,333 discloses a rear projection device; it is provided on one face with microscopic step elements, for example a Fresnel lens. The other face carries an opaque layer having apertures formed by a photographic process. French patent application serial number 959,731 discloses a rear projection screen. It is formed from a support layer, an absorbent layer and a plurality of small spheres embedded in the opaque layer; the teaching of this document is similar to that of U.S. Pat. Nos. 5,781,344 and 5,563,738.

SUMMARY OF THE INVENTION

The invention proposes a solution to the various problems of rear projection screens. It provides a screen having excellent rear-to-front transmissivity, and good front-to-back absorption; it consequently provides excellent contrast. Further, in one embodiment, directivity can be controlled; it also avoids moiré patterning effects brought about by surface periodicity. In one further embodiment, a screen is provided the front surface of which has a brilliant or shiny appearance, and which nevertheless has excellent contrast and controlled directivity.

More precisely, there is provided a screen comprising a support with focusing elements, and an opaque layer with apertures allowing the passage of the light focused by the focusing elements, said apertures making up less than 10% of the surface area of the opaque layer.

In one embodiment, the opaque layer is close to the focal points of the focusing elements.

Preferably, the apertures are not dot-shaped.

In one embodiment, the size of the apertures is comprised between 2 micrometers and 200 micrometers.

In a further embodiment, the apertures make up less than 5% of the total surface.

The screen has a contrast greater than 250, and preferably greater than 500.

According to a further embodiment, the focusing elements have a dimension comprised between 20 micrometers and one millimeter.

The transmissivity of the screen is preferably greater than 70%.

According to a further embodiment of the screen, the square $(\phi_{holes}/\phi_{focusing})^2$ of the ratio between aperture dimension $\phi_{holes}$ and focusing element dimension $\phi_{focusing}$ is less than or equal to 10%, preferably less than or equal to 5%.

According to a further embodiment, the focusing elements comprise lenticular elements, the apertures are in the form of a line and the ratio between line width and a distance between two adjacent lines is less than or equal to 10%, preferably less than or equal to 5%.

In a further embodiment of the screen, the filling ratio by focusing elements is greater than or equal to 90%.

The focusing elements can comprise microballs in which case the screen preferably has a transmissivity greater than or equal to 80%, particularly preferably greater than or equal to 85%.

The focusing elements can also comprise microlenses or lenticular elements in which case the screen preferably has a transmissivity greater than or equal to 90%, particularly preferably greater than or equal to 95%.

The screen can further comprise a diffuser adjacent to the opaque layer, preferably a diffuser controlling directivity.

The screen can have a spacer layer between the support and the diffuser, preferably of a thickness between a few microns and several tens of microns.

This diffuser preferably has an active surface directed towards the spacer layer. The screen can have a transparent plate adjacent to the diffuser and bonded thereto. The diffuser is preferably a holographic diffuser. The screen can comprise a reflector adjacent to the opaque layer. The reflector is preferably a reflector controlling directivity.

A method for producing a screen is also provided, comprising the steps of:

providing a support having a plurality of focusing elements, and a layered material adjacent to the points of focus of said focusing elements;

irradiating said material through said focusing elements;

forming, using the irradiated material, an opaque layer having apertures making up less than 10% of the surface area of said opaque layer.

According to one embodiment of the method, the focusing elements comprise microlenses, lenticular elements or microballs.

According to another embodiment of the method, the focusing elements comprise microballs and the method further comprises the formation of a second opaque layer between the microballs, prior to the irradiation step.

According to one embodiment of the method, the material is an opaque positive-going photosensitive resin, and the formation step comprises the development of the resin.

According to n embodiment of the method, the material is a material that can be destroyed by irradiation and the formation step is performed by destruction of material at the same time as the irradiation step.

According to another embodiment of the method, the material is a positive photographic material and the formation step comprises:

the development of this photographic material.

According to a further embodiment of the method, the material is a material able to be decolored by irradiation and the formation step is performed by material decoloration at the same time as the irradiation step.

According to yet a further embodiment the method further comprises the steps of:

forming, on the support or the opaque layer, a spacer layer with a thickness of from a few microns up to several tens of microns;

forming apertures in the spacer layer, in correspondence with the focal points of the focusing elements;

bonding a diffuser onto the spacer layer, an active face of the diffuser being directed towards the spacer layer.

A transparent plate can be applied to the diffuser by bonding.

There is further provided a screen having a contrast greater than 250, preferably greater than 500.

Further characteristics and advantages of the invention will become more clear from the description that follows of some embodiments provided by way of non limiting example and with reference to the attached drawings.

BRIEF DESCRIPTION OF THE DRAWINGS

FIG. 1 shows diagrammatically a section through a screen according to a first embodiment;

FIG. 2 shows diagrammatically a section through a screen according to a second embodiment;

FIG. 3 shows diagrammatically a section through a screen according to a third embodiment of the invention FIG. 4 shows diagrammatically a screen according to a fourth embodiment, close to the center of the screen;

FIG. 5 shows diagrammatically the screen in FIG. 4, close to its edge;

FIG. 6 shows diagrammatically a section through a screen according to a fourth embodiment;

FIG. 7 shows diagrammatically a section through a screen according to a fifth embodiment of the invention.

DETAILED DESCRIPTION OF PREFERRED EMBODIMENTS

We provide a screen formed by a set of focusing elements with which an opaque layer is associated, this layer having transparent apertures to allow the passage of light focused by the focusing elements. The screen can be used for rear projection like the screens in FIGS. 1–3 or for forward projection like the screens in FIGS. 4 and 5.

The focusing elements can for example comprise microspheres like in the embodiments of FIG. 3, or also microlenses or lenticular elements like in the embodiments of FIGS. 1 and 2. These focusing elements ensure good brightness and practically complete transmission of the light projected onto the rear of the screen towards the front of the screen; this is notably the case with microlenses or lenticular elements for which the filling ratio can reach, or exceed 90% or even 95%. Transmissivity can exceed 70%; it can typically reach 90% or even 95% without a holographic layer where the focusing elements are microlenses or lenticular elements. It can reach 80% or even 85% without a holographic layer where the focusing elements are microspheres.

It is particularly advantageous when the focal length of these focusing elements is fairly long so as to minimise chromatic aberration. Typically, one will preferably choose a focal length greater than or equal to 1.5 mm, for example close to 2 mm. For focusing elements having, in the plane of the screen, a size of the order of 300 micrometers, this focal length will ensure that the light focused by the focusing elements is contained within a cone with a central angle greater than 5.7° (Arctan (0.150/1.5)), which minimises aberrations brought about by the focusing elements.

Since the opaque layer has transparent apertures to allow light focused by the focusing elements to pass but absorbing incident light, the screen of the invention achieves high contrast; contrasts of 250 or more, and even contrasts above 500 can be achieved. Apertures of a size between a few micrometers and several tens of micrometers or even 200 micrometers for one millimeter microlenses can be provided. The opaque surface can make up more than 90%, or even more than 95% of the screen surface, so as to absorb practically all the light incident on the screen.

Another definition of the invention can be given by the ratio between aperture dimension—and their diameter $\phi_{hole}$ if they are circular—and focusing element size —their diameter or $\phi_{focusing}$ if they are circular. Preferably, the square $(\phi_{holes}/\phi_{focusing})^2$ of this ratio is less than or equal to 10%, or even less than or equal to 5%. Where lenticular focusing elements are used the apertures in the opaque layer have the form of lines; the relation is now written as the ratio between the width of the transparent aperture in the form of a line and the distance between two adjacent apertures or lines in the opaque layer less than or equal to 10%, preferably less than or equal to 5%.

Provision can also be made for the dimension of the apertures to be less than 20% of focusing element dimension. In the case of lenticular elements, line or aperture width is less than 10 or 5% of lenticular element width.

Each focusing element provides focusing of the projected light; the material forming the opaque layer is arranged so that the apertures allow light focused by the focusing elements to pass, for maximising projector brightness and consequently contrast.

The invention additionally provides a method for producing a screen, ensuring excellent contrast. To ensure such contrast, the method of the invention proposes forming the opaque layer by irradiation through the focusing elements. The method applies particularly to the production of a screen such as the ones described below.

FIG. 1 is a diagrammatic view in section of a screen according to a first embodiment of the invention; in this embodiment, the focusing elements consist of microlenses; lenticular elements could also be used and in this case, FIG. 1 is a sectional view in a plane perpendicular to the non-varying direction of the lenticular elements. The screen in FIG. 1 has a support 2 having, on its rear surface 4, a plurality of microlenses 6. The products available from Mems Optical and RPC mentioned above could also be used as the microlens support. The shape and arrangement of the microlenses can be chosen as a function of the application and one can for example employ elongated microlenses to provide lower directivity in one direction. Such shapes of microlens can be used as a replacement for a holographic diffuser of the type discussed below or, yet again, in combination with such a holographic diffuser, for reinforcing the effectiveness of the holographic diffuser as regards its directivity.

An opaque layer 10 is provided on the rear surface 8 of support 2. In the embodiment of FIG. 1, the microlenses are chosen so that their focal point is close to the opaque layer, and preferably they are situated in the mid-plane 11 of the opaque layer. In practice, for thin opaque layers, it is sufficient for the focal point of the microlenses to be close to the front surface of support 8.

The opaque layer has apertures 12 through which the light focused by the microlenses can pass. These apertures in the opaque layer are arranged so as to allow the light focused by the focusing elements to pass through and are sufficiently small to allow high contrast to be obtained. Aperture dimension can for example be less than 20% of the microlens dimension. One can also simply provide for the apertures to make up less than 10% or even less than five % of the opaque layer surface area, or for the square of the ratio $(\phi_{holes}/\phi_{focusing})^2$ between aperture size and microlens size to be less than 10% or even, preferably, less than 5%. In the case of lenticular elements as explained above, this ratio is transformed into the ratio between the width of the apertures in the form of a line and the distance between adjacent apertures.

In practice, the simplest solution for obtaining small dimension apertures providing, consequently, high contrast, consists in arranging the opaque layer close to the focal points of the focusing elements, like in the embodiment of FIG. 1; this is not essential if the apertures are sufficiently small compared to the total opaque layer surface or compared to focusing element size. More generally, the rays that pass through the opaque layer can be convergent or divergent. In the embodiment of FIG. 7, divergent rays are employed.

The nature of the opaque layer and the method for making it are indicated by way of example below. The term aperture should be taken to mean a region into which the opaque layer does not extend or which allows light focused by the focusing elements to pass. The apertures are indeed transparent for the light employed in the rear projector.

The screen can further have a backing substrate 14 of glass or plastic, optionally with a non-reflecting layer 16.

The screen in FIG. 1 has excellent luminance. The filling ratio of support 2 by the microlenses can exceed 90% or even 95%. This means that practically all the light projected onto the rear side of the screen is condensed by the microlenses and passes through the opaque layer to be visible to users of the screen. Additionally, a microlens support creates practically zero attenuation as a transparent material can be used to produce it.

The screen additionally has excellent contrast. As the focal points of the microlenses are close to the opaque layer, and are preferably inside the opaque layer, the latter can extend over a large proportion of the screen surface. By way of example, for microlenses in a hexagonal configuration and spaced by 205 microns, of individual diameter 200 microns, on a 700 micron thick support, with a 600 micron focal length, an aperture 12 of a diameter of the order of 35 microns can be provided close to the focal point of the microlens; in such an arrangement, each aperture allows the light focused by a focusing element to pass, and the square of the ratio $(\phi_{holes}/\phi_{focusing})^2$ between hole diameter and microlens diameter is of the order of 3%. The opaque layer extends over more than 95% of screen surface, and contrast is higher than 300 for an illumination of 1000 lux.

The screen also has excellent resolution. Resolution indeed only depends on microlens size, and the distance between them. In the example, resolution is of the order of 200 micron.

The screen in FIG. 1 is particularly suitable for analog rear projection. It can also be employed for digital rear projection; in this case, it is advantageous, to avoid moiré effects on the screen, to arrange for the microlenses to correspond to the projected or displayed pixels.

FIG. 2 is a diagrammatic view in section of the screen according to a second embodiment of the invention; compared to the embodiment of FIG. 1, the embodiment of FIG. 2 allows screen directivity to be controlled and avoids, in digital applications, moiré effects without however the need to align the microlenses with the projected pixels. Like in FIG. 1, the focusing elements can consist of lenticular elements.

The screen in FIG. 2 has a support 22 having, on a rear surface 24 thereof, a plurality of microlenses 26. Attached to the front surface 28 of the support, a diffuser 30 controlling directivity is attached, or example by lamination, and is for example a holographic diffuser of the type available from the Physical Optics Corporation; films from other suppliers mentioned above could also be used. In the example of FIG. 2, diffuser 30 has a smooth surface 32 which is arranged at, for example bonded to, the front surface 28 of support 22. Surface 34 of diffuser 30 has the holographic imprint covered by an opaque layer 36.

Like in the embodiment of FIG. 1, the microlenses are shaped, depending on the thickness of diffuser 30, so that the focal point of each microlens is close to the opaque layer. Like in FIG. 1, the latter has apertures 38 close to the focal points of the microlenses allowing light rays concentrated by the microlenses and scattered by diffuser 30 to pass. As the diffuser is close to the opaque layer, the light rays deviated by the diffuser pass through the apertures in the opaque layer. The nature of the opaque layer and its method of production are exemplified below.

The screen further has a substrate 14 in glass or plastic optionally with an anti-reflecting layer on its front surface 42. Preferably, to improve operation of the holographic diffuser, the substrate is assembled by bonding using adhesive dots which do not cover the apertures; this ensures that possible adhesive does not hinder operation of the holographic diffuser in the region of the apertures. This can be achieved by depositing the adhesive using known microelectronic techniques. Dots of adhesive which simply cover a small proportion of screen surface including, optionally, the apertures can be employed in which case, if the surface area of the adhesive is small compared to the surface area of the screen, its effect can be neglected. Spacers a few microns thick can also be employed between the holographic diffuser and the substrate. If necessary, substrate 40 is provided with an anti-reflection layer on both sides.

The screen in FIG. 2 has all the advantages of the screen in FIG. 1. The presence of diffuser 30 additionally allows directivity to be controlled; the diffuser only affects luminance slightly; holographic diffusers supplied by the Physical Optics Corporation have, for example, a transmissivity better than 90% in the back-to-front direction. The diffuser has no effect on light incident on the front face of the screen, and contrast remains at the same order as that for the screen in FIG. 1.

The some 10% of light that is backscattered either passes through the microlenses and is absorbed by the rear projector with darkened internal walls, or is refracted by total internal refraction through the microlenses to be directed forwardly where 95% of it is absorbed by the black layer of the screen.

The screen in FIG. 2 lends itself more readily to digital rear projection; the presence of diffuser 30 avoids moiré effects brought about by the periodicity of the pixels projected and that of the microlenses, without the need to align the pixels projected with the microlenses. The teachings of the embodiments of FIGS. 1 and 2 can be applied to focusing elements in the form of microballs. The various characteristics of the screen are now the same, and notably the relative dimensions of the apertures and focusing elements, or the relative dimensions of the apertures and the opaque layer can be the same.

We shall now describe a method for producing a screen; this method applies advantageously to the production of a screen of the type shown in FIGS. 1 and 2. The method essentially comprises forming, by irradiation through the focusing elements, apertures in the opaque layer to allow light focused by the focusing elements to pass.

The nature of the irradiation depends on the nature of the opaque layer; we shall now give examples for focusing elements formed by microlenses. In the examples, it will be noted that the irradiation is performed either directly onto the opaque layer or onto a material which subsequently allows the opaque layer to be formed. In both cases, the layer or the material are advantageously arranged at the position of the opaque layer in the finished screen.

In a first embodiment, the opaque layer is formed by photolithography. The method comprises providing a support having microlenses and, optionally, a diffuser. In a second step, a positive-going photosensitive resin is deposited on the support after previously incorporating therein particles to make it opaque. In the case of a black coloured opaque layer for colour projection applications, carbon, ferrite black, or cobalt oxide particles can be used. A photosensitive resin can for example be the AT type resin available from the Shipley company.

The method then comprises the step of irradiating the photosensitive resin from the back, i.e. through the microlenses, with radiation appropriate to the nature of the resin. The light employed for irradiation is concentrated at the microlens focal points, the resin being consequently exposed in the region of these points. Irradiation continues for a sufficient period of time to expose the resin so as to then allow the light focused by the microlenses to pass; the presence of opaque particles increases the duration of irradiation compared with the recommended time, but longer irradiation does allow resin exposure.

It is advantageous when irradiation of the resin is done with light that is directed like the light will be directed when subsequently projected when the screen is used. Thus, if the screen is subsequently used with a point source provided at a given position with respect to the screen, the irradiation source can be arranged at the same position with respect to the screen during irradiation. One thereby improves transmissivity for light originating directly from this source, and particularly at the edges. This is true not only for the first embodiment just described, but also for all the embodiments of the method of the invention.

After the irradiation step, the method comprises a step of developing the resin allowing the resin that has been exposed to be removed.

Photolithographic techniques are well known as such to the person skilled in the art and can be readily applied.

In the first embodiment, the material is consequently a positive-going photoresist or photosensitive resin incorporating opaque particles, and formation of the opaque layer is done by developing the resin and removing resin exposed during irradiation, at the focal points of the microlenses or in the region thereof. In this case, the opaque layer is typically a few microns thick.

In a second embodiment, the opaque layer is formed by irradiation so as to destroy the material forming the opaque layer at the focal points of the microlenses. Just like the first embodiment, the method comprises a first step of providing a support having microlenses and, optionally, a diffuser. In a second step, the material intended to form the opaque layer is deposited directly on the support. Any suitable opaque material able to be destroyed by irradiation with radiation concentrated by the lenses can be used and, for example, a black plastic film can be used able to be punctured by a Co2 laser with a wavelength of 600 or 800 nm. In this case, the opaque layer is typically 2 to 3 microns thick. The method then comprises a step of irradiating the opaque layer from the back, i.e. through the microlenses, with radiation appropriate to the nature of the opaque layer. In the example of the product given above, laser radiation can be used. Like in the first embodiment, it will be seen that the light used for radiation is concentrated around the focal points of the microlenses: the opaque layer is consequently destroyed in the region of the microlens focal points. A washout stage can be provided if necessary.

In this second embodiment, the irradiated material is directly the material of the opaque layer and opaque layer formation is performed during irradiation, by material destruction.

In a third embodiment, the opaque layer is formed by photography using a film or a positive-going photographic material. The method comprises a first step of providing a support having microlenses and, optionally, a diffuser. In a second step, a positive photographic film is placed on the support. Such films are known per se and are widely available on the market, notably from Kodak, Agfa or Fuji. In this case, the opaque layer is typically less than one micron thick.

The method then comprises a step in which the opaque layer is irradiated from the back, i.e. through the microlenses with radiation appropriate to the nature of the opaque layer. For a positive photographic film, one can simply employ any type of actinic light, and simply white light. The light employed for irradiation is concentrated at the microlens focal points: exposure of the film consequently occurs in the region of the microlens focal points. After this, the photographic film can be developed.

After development, the film is transparent in the region of the microlens focal points and is black—or any other chosen colour—elsewhere. Like the case above, a protective layer, substrate or other layer can now be applied.

In this third embodiment, the material is consequently a photographic film; a positive photographic material can also be directly deposited on the support or the hologram thereby avoiding the problem of developing the film at its two sides. If a photographic film for development at its two sides is used, it is possible to proceed with prior development of that side of the film designed to be applied to the support or holographic diffuser. In the third embodiment, the step of forming the opaque layer simply comprises developing the photographic film or photographic material.

In a fourth embodiment, the opaque layer is formed by material decoloration. The method comprises the first step of providing a support having microlenses and, optionally, a diffuser. In a second step, a material able to be decolored by irradiation is placed on the support; one can for example use the films available from the Westlake company known as "Acetal film" which can be decolored by a laser operating around 600 nm. One can also directly apply the corresponding active product. If necessary, spacers can be provided between the support and the film. The "Acetal film" films are available in various colours. In this case, the opaque layer is typically several microns thick.

The method then comprises a step of irradiating the opaque layer from the back, i.e. through the microlenses with radiation appropriate to the nature of the opaque layer. For this fourth embodiment, light suitable for decoloring the material is used. This light is concentrated at the focal points of the microlenses: the material is consequently decolored in the region of the microlens focal points. After irradiation, the material is transparent at these focal points and is opaque elsewhere. One can now, if necessary, apply a protective layer, a substrate or anti-reflection layer.

In this fourth embodiment, the material is the material of the opaque layer and the opaque layer is formed at the same time as irradiation by material decoloration.

Glass provided with a surface opacity and which is rendered transparent by irradiation (metal precipitates which are transformed to oxides that are transparent, by irradiation) can also be employed.

Compared to the method for forming an opaque layer disclosed in U.S. Pat. No. 5,563,738, the method of the invention leads to the formation of true apertures in the opaque layer of controlled dimension; suitable transmission over the whole surface of the screen is consequently ensured. Screen transmissivity is thus increased and consequently, contrast. In U.S. Pat. No. 5,563,738, the opacity of the microball keying layer is chosen so as to allow light projected from the back forwardly to pass around the points of contact between the microballs and their support; this pleads in favour of low opacity. However, opacity is necessary for absorbing the light incident on the front face of the screen. The opacity of the keying layer is consequently the result of a trade-off between rear-to-front transmissivity and front-to-back absorption. The invention makes it possible to avoid this trade-off and to provide a highly opaque layer for keying the balls while preserving excellent transmissivity in the rear-to front direction.

The method of the invention applies equally as well to focusing elements which are not microlenses and are rather balls or spheres, like in U.S. Pat. No. 5,563,738. In this case, the method of the invention makes it possible to improve still further screen contrast. The method is described with reference to FIG. 3 which shows one example of a support carrying microballs.

Support 44 is covered with an opaque layer 46 and then with a keying layer 48 in which microballs 50 are arranged. Next, a second opaque layer 52 is formed above the keying layer; this second opaque layer makes it possible to limit light transmitted via the interstices between the balls during the irradiation step. Now, other layers as explained in the cited patent can be formed in order to better control focusing by the microballs.

Next, apertures 54 are formed in the opaque layer, according to the invention. The method consequently comprises a step of irradiating the opaque layer 46 from the back, i.e. through the microballs with radiation appropriate to the nature of the opaque layer. Because of the presence of the second opaque layer 52, light passing between the microballs does not irradiate the first opaque layer 46. One can notably apply the second and fourth embodiments described above, and proceed to destroy or decolor the material of the opaque layer. These embodiments are valuable for the structure in FIG. 3 as they can be employed without accessing the opaque layer.

In this way, actual apertures are formed in the opaque layer 46; as explained above, a highly opaque material can now be used for the opaque layer. It is clear that after forming the apertures, the second opaque layer 52 is not indispensable as light passing between the balls is stopped by the first opaque layer 46. It can consequently be removed and replaced by other layers.

As explained with reference to FIG. 2 which refers to the use of microlenses, one can, in the embodiment in FIG. 3, add a diffuser and notably a holographic diffuser.

With reference to FIGS. 4 and 5, a fourth embodiment of the invention is described that provides a screen suitable for use for front projection. The screen in FIGS. 4 and 5 has a similar structure to the screen of FIG. 2, but with a reflector.

More precisely, the screen comprises a support 60 with focusing elements—in the example of FIGS. 4 and 5, microlenses 61. At the focal point of the microlenses, on the side of the support facing the microlenses, an opaque layer 62 with apertures 63, is provided. The apertures can have the same characteristics as the apertures discussed above with reference to FIGS. 1–3. The screen further has a reflector 65 which reflects the light passing through the apertures. This is advantageously a holographic reflector, for example a holographic diffuser having an outer aluminium film reflector; such a holographic reflector is available from the Physical Optics Corporation and enables the directivity of the reflected light to be controlled. Reflectors available from Krystal Holographic International Inc can also be used. One can also use for the reflector, micro-prisms or other structures well known to those skilled in the art. The structures make it possible to reflect the light with a controlled angle. The complete assembly can be bonded onto a glass or plastic substrate 67.

The screen of FIG. 4 can be obtained using the same procedures as described above. To ensure optimal screen operation and notably to ensure rays projected at the edges are reflected towards the viewer, it is advantageous for the irradiation step to be carried out with a source at the point where subsequently the projector will be provided.

Operation of the front projection screen will now be explained with reference to FIGS. 4 and 5. This relies on the principle that the light projected on the screen originates from a given direction which is that of the projector whereas ambient light arrives from all directions; light from the projector is now substantially completely focused by the focusing elements and reflected by the reflector in the direction of the viewer. The fact of using a holographic reflector makes it possible, in this case, to control the direction of reflection of the light originating from the projector and notably, to redirect light projected onto the edges of the screen to the viewer. As against this, ambient light which a priori does not come from the projector is refracted by the focusing elements onto the opaque layer where it is absorbed. The screen consequently has a much higher contrast than conventional projection screens and notably higher than screens employing scattering, glass bead screens or even aluminized holographic screens available from Physical Optics Corporation. It allows projection in an undarkened room without the need to eliminate all ambient light. This is a new and important characteristic and notably allows low-cost LCD projection in meeting rooms, design offices or other normally-lit places.

FIG. 4 shows the screen, at a position close to its center. FIG. 5 shows the screen close to its edge. Rays originating from the projector incident on the screen are shown in solid lines, these being for the major part focused into the apertures of the opaque layer and reflected by the reflector towards the viewers; incident rays from ambient light are shown in dashed lines, these being for the most part being absorbed by the opaque layer. Angle $\alpha$ on FIGS. 4 and 5 shows the angular sector inside which collimated or substantially collimated light originating from the projector is reflected back; as FIG. 4 shows, at the center of the screen, the light is reflected back within an angular sector with its axis substantially perpendicular to the screen, towards the public. As FIG. 5 shows, at the edges of the screen, the light is reflected back towards the center of the screen in an angular sector which is directed towards the public.

FIG. 6 is a diagrammatic view in section of a screen according to a fourth embodiment of the invention; in this embodiment, microlenses are used as a focusing element like in the embodiments of FIGS. 1 and 2. Lenticular elements can also be used as focusing elements or, yet again, crossed lenticular arrays as suggested in British patent application 369,611. As indicated above, it is advantageous for the microlenses 76 formed on the rear surface 74 of support 72 to have a large focal length and, typically, a focal length at least five times greater than their size. In the example of microlenses having a radius of some 300 $\mu$m, the focal length is consequently greater than 1.5 mm. More generally, a focal length around 2 mm, for example between 1.5 and 3 mm, is advantageous.

On the front face of support 72, an opaque layer 78 provided with apertures 80 in the region of the focal points of the focusing elements is provided. This opaque layer and its apertures can be obtained using one of the processes described above. In this embodiment too, it is advantageous for the ratio between aperture surface area and total surface area of the opaque layer to be less than 10%, or even less than 5%.

A holographic diffuser 82 is bonded onto the opaque layer by means of adhesive 81, the front side of the diffuser having a holographic pattern. The fact of providing the diffuser in this sense in other words with its smooth side against the opaque layer has the following advantages: firstly, one avoids any traces of adhesive on the holographic pattern thereby preserving screen directivity. In this embodiment, it is not necessary to provide a complex bonding scheme for avoiding adhesive on the holographic pattern. As shown, the adhesive can be applied to the opaque layer and inside the apertures with a thickness which can be significant; to maintain resolution, it is sufficient for the thickness of adhesive layer 81 and of diffuser 82 to be less than the focal length of the focusing elements. One can consequently provide a good adhesive thickness, for example of the order of 0.5 mm which is advantageous in the presence of difficult climatic conditions (humidity and temperature).

Additionally, with the holographic screen directed outwardly, ambient light which is incident within the transmission cone is transmitted towards the projector; the remainder of the incident light is practically completely absorbed in the opaque layer; the screen consequently has a high degree of contrast. It has a distinctively dark black colour unlike devices of the type available for example from the Jenmar company which have a grey-yellow colour. The invention provides a matt screen having high contrast and controlled directivity.

Another type of diffuser different from a holographic diffuser can be used. For example, a translucid milky-finish diffuser or a shot-blasted surface diffuser can be used. In the case of a milky finish diffuser bonded onto a transparent substrate, it is advantageous to bond the diffuser directly onto the opaque layer; this limits deterioration in contrast by backscattering in the diffuser particularly if the substrate is provided with an anti-reflection layer. It can also be useful, in this case, to provide an outer opaque layer so as to limit backscattering of incident light. It is then useful if total screen thickness is of the order of the focal length of the focusing elements, so that the apertures in the opaque layer obey the relations above (less than 10% or even 5% of total surface area).

FIG. 7 is a diagrammatic view in section of a screen according to a fifth embodiment of the invention. This embodiment makes it possible to obtain a screen having high contrast, good directivity and a brilliant appearance. It proposes an alternative solution to bonding a holographic diffuser. Like the screen in FIG. 6, the screen in FIG. 7 uses microlenses 76 formed on the rear surface 74 of support 72 as focusing elements. As explained in relation with FIGS. 1 and 2, lenticular elements can also be used. Microlens and support thickness are chosen so that rays focused by the microlenses diverge towards the front side of support 72.

In the example of 300 $\mu$m diameter microlenses and a focal length of 2 mm, a support of the order of 2.5 mm thickness can be chosen. In this case, the apertures in the opaque layer have a diameter of the order of 67 $\mu$m and the ratio between total aperture surface area and total surface area of the opaque layer is about 5%.

In the embodiment of FIG. 7, a spacer layer is provided between the microlens support and the holographic diffuser. This spacer layer has apertures that correspond with the apertures in the opaque layer. They allow the holographic diffuser to be bonded onto the support with the holographic pattern directed towards the support without the adhesive affecting operation of the diffuser. As FIG. 7 shows, an opaque layer 78 can be provided on the front face of the support with apertures formed using one or the other of the methods described above. This opaque layer is not obligatory.

We now give the example of a spacer layer formed using a positive-going photosensitive resin. A layer of the positive photosensitive resin 84 is formed on opaque layer 78 or on the face of the support in the absence of an opaque layer; this layer is advantageously a few microns up to several tens of microns thick; this thickness depends on the bonding technique subsequently employed and it is sufficient to avoid any pollution of the apertures by the adhesive. Dry photosensitive resins 50, 30 or 50 $\mu$m thick can also be used; such resins are applied to the support by dry lamination. Exposure of the resin layer through the screen typically using ultraviolet light then follows, similarly to the exposure of the opaque layer for forming the apertures and this is followed by development. Apertures 86 are consequently formed in the resin layer matching the apertures in the opaque layer. Because of the divergence of the rays focused by the focusing elements, these apertures have a conical shape.

Next, an opaque layer 88 can be formed on the layer 84 of photosensitive resin with apertures that match the apertures in the photosensitive resin layer, for example using one of the methods described above. It is also possible to form the opaque layer using flat offset printing, or some other printing technique; in this case, the divergence of the apertures in the photosensitive resin layer ensures the opaque layer does not extend into the apertures allowing light focused by the focusing elements to pass.

Layer 88 is a second opaque layer in the case where an opaque layer has already been formed on the front face of a support; this can also be a first opaque layer if an opaque layer has not been formed on the front face of the support. This layer is also optional if an opaque layer has already been formed.

Because of the presence of the photosensitive resin layer and the thickness thereof, it is possible to then bond a diffuser, and for example a holographic diffuser, with its interference pattern or holographic pattern directed towards the focusing elements. For this, it is sufficient to coat the layer 84 of photosensitive resin or opaque layer 88 with a layer of adhesive. Because of the thickness of the layer and the size of the apertures, it is possible to deposit the adhesive without blocking the apertures and, for example, for applying the adhesive, an offset printing technique or other technique can be employed depending on the thickness of a spacer layer. Next, a diffuser 90 is applied to the layer of adhesive. The active face of the diffuser is directed towards the focusing elements. It is nevertheless free standing at the apertures in the opaque layer(s) and photosensitive resin layer. This ensures correct operation of the diffuser, its properties not being affected by the adhesive.

In the embodiment of FIG. 7, the formation of a the spacer layer using a commercially available positive-going photosensitive resin is explained. A photosensitive resin incorporating a filler to render it opaque can also be used as explained above in connection with the opaque layer. In this second case, it is no longer indispensable to provide opaque layers at both sides of the spacer layer.

The lift-off process can also be used: this involves applying a negative-going resin which is exposed and developed so as to leave pillars corresponding to the rays focused by the focusing elements. Next, using for example screen printing, an opaque layer, typically carbon black embedded in a non-photosensitive resin is applied after which the negative resin pillars are eliminated. This enables a thick opaque spacer layer to be obtained. One can also, in the lift-of process, apply a layer which is not opaque around the pillars and, in this case, one or several of the opaque layers adjacent to the spacer layer is/are retained.

Finally, before forming the spacer layer, a laminated layer which is dry-rolled onto the support, and which is destroyed locally by the rays focused by the focusing elements, can be used. This embodiment is similar to what has already been discussed above regarding the opaque layer.

The screen can be used as such, the front face of the screen then being constituted by the rear face of the diffuser. In this case, any possibility of contamination reaching the active face of the diffuser is prevented. Optionally, a transparent plate 92 in glass or similar can be bonded to the screen optionally provided with an anti-reflecting layer 94. This provides the screen with greater mechanical rigidity. Additionally, the presence of glass gives the screen a glossy appearance which can be useful in some applications. The presence of one or several opaque layers below the glass ensures good contrast and a dark black appearance for the screen.

One can also, although this is not shown in the drawing, provide an opaque layer on the front face of the diffuser. The latter is arranged between the diffuser and glass plate 92; it improves the black appearance of the screen and increases contrast.

It will be understood that in the description of FIG. 7, one, two or three opaque layers can be formed on both sides of spacer layer 84 and on both sides of diffuser 90. If the spacer layer is opaque, additional opaque layers can be dispensed with. The presence of several opaque layers improves contrast and also improves the black appearance of the screen. Because of the divergence of the rays, it is possible for the ratio between aperture surface area and total surface area of the opaque layer to be greater than 5 or 10% for the second or third layer. Nevertheless, contrast remains high in all cases.

The embodiment of FIG. 7 improves diffuser performance and avoids aberrations produced by the adhesive or by contamination which could get deposited on the active face of the diffuser. This increases screen life. The embodiment of FIG. 7 ensures good mechanical cohesion between the different elements of the screen, with, typically, bonding over more than 90% of the surface between the diffuser and the photosensitive resin; this reinforces the screen independently of differences between coefficients of expansion of the elements composing it—focusing element support, diffuser and glass plate. Further, the fact that the diffuser is bonded uniformly over its whole surface ensures that transmission is equally as good at the center of the diffuser as well as at its edges. This makes it possible to place screens side by side in a so-called image or picture wall, without edge effects.

Obviously, the present invention is not limited to the examples and embodiments described and illustrated but may be subject to numerous variations accessible to those skilled in the art. Thus, it is clear that the relative position of the microlenses and their support can be varied provided the focal point of the microlenses is close to the opaque layer. In the case of FIG. 1, one could for example arrange the microlenses on the front face of the support, add an intermediate transparent layer and then an opaque layer in the region of the focal point of the microlenses. In the case of FIG. 2, the microlenses could be provided on the front face of support 22, always ensuring that their focal point is close to the opaque layer.

In the embodiments discussed, examples of microlenses and microballs have been described. One could, also, according to the invention, use lenticular focusing elements. Thus, FIGS. 1, 2, 4–7 can also correspond to embodiments using lenticular elements which, in section, are perpendicular to the non-varying axis of the lenticular elements. Moiré patterning problems discussed above disappear with diffuser elements, and notably with a holographic diffuser.

Known treatments can further be applied to the screen of the invention such as an anti-reflection treatment on one or the other side of the screen. The term "support" employed for the embodiments of FIGS. 1 and 2 refers to microlenses; the screen can also comprise a rigid support such as a glass plate or a material having low scattering properties. Other types of microlenses than the ones indicated by way of example can be used.

The method of the invention is not limited to the four embodiments given by way of example. One can also form the opaque layer by irradiating other types of material through the microlenses or focusing elements. One can also employ the photolithographic lift-off process: application of negative photosensitive resin pillars at the points of focus of the focusing elements; covering the whole surface with a black layer and then eliminating the resin pillars and the black layer at the locations of these pillars, only retaining a black layer with apertures at the points of focus.

Throughout this description, we have used the terms "opaque layer" and "transparent aperture". In the case of colour projection, the opaque layer is typically black and the apertures are transparent, in other words allowing all wavelengths of visible light to pass; in fact, the term "transparent" should be taken to mean transparent towards the light focused by the focusing elements and the term "opaque" should be taken to mean opaque towards the light focused by the focusing elements. Thus, in the case of a projection screen intended to be used with red light, a blue opaque layer could be used so as to absorb the red component of ambient light, and provide high contrast for the colour red.

One can use, notably in the embodiments of FIGS. 6 and 7, other diffusers apart from holographic diffusers. For example, one can use diffusers in a semi-transparent material or diffusers in a transparent material having an irregular surface, notably a shot-blasted surface. In the case of FIG. 7, it is advantageous for the irregular face of such a diffuser to be directed towards the focusing elements; the presence of the photosensitive resin layer and divergence of the rays avoids any pollution of the active layer, with scattering, by the adhesive.

One could yet again, in the embodiment of FIG. 7, arranged the diffuser with its non-active face directed towards the focusing elements and form the photosensitive resin layer on top of the active face of the diffuser; this embodiment is nevertheless less advantageous considering that it can lead to the active face of the diffuser being damaged by the treatments of the resin layer.

What is claimed is:

1. A screen, comprising a support with focusing elements, said support being adjacent to a diffuser having an active surface, said diffuser being adjacent to an opaque layer with apertures to allow light focused by said focusing elements to pass, a reflector adjacent to the opaque layer, and a substrate covering a surface of a volume comprised of said diffuser and opaque layer.

2. The screen according to claim 1, wherein the reflector is a reflector controlling directivity.

3. A method for producing a screen, comprising the steps of:

providing a support having a plurality of focusing elements, and a layered material adjacent to the points of focus of said focusing elements;

irradiating said material through said focusing elements;

forming, using the irradiated material, an opaque layer having apertures making up less than 10% of the surface area of said opaque layer;

bonding a diffuser onto said support or said opaque layer;

covering a surface of a volume comprised of said diffuser and said opaque layer with a substrate.

4. The method according to claim 3, wherein said focusing elements comprise microlenses, lenticular elements or microballs.

5. The method according to claim 3, wherein the focusing elements comprise microballs and the method further comprises the formation of a second opaque layer between the microballs, prior to the irradiation step.

6. The method according to claim 3, wherein the material is an opaque positive-going photosensitive resin, and the said formation step comprises:

the development of said resin.

7. The method according to claim 3, wherein the material is a material that can be destroyed by irradiation and said formation step is performed by destruction of material at the same time as said irradiation step.

8. The method according to claim 3, wherein the material is a positive photographic material and wherein the formation step comprises:

the development of said photographic material.

9. The method according to claim 3, wherein the material is a material able to be decolored by irradiation and wherein the formation step is performed by material decoloration at the same time as the said irradiation step.

10. A method for producing a screen, comprising the steps of:

providing a support having a plurality of focusing elements, and a layered material adjacent to the points of focus of said focusing elements;

irradiating said material through said focusing elements;

forming, using the irradiated material, an opaque layer having apertures making up less than 10% of the surface area of said opaque layer;

forming, on said support or said opaque layer, a spacer layer with a thickness of from a few microns up to several tens of microns;

forming apertures in said spacer layer, in correspondence with the focal points of said focusing elements;

bonding a diffuser onto said spacer layer, an active face of said diffuser being directed towards said spacer layer; and covering a surface of a volume comprised of said diffuser and said opaque layer with a substrate.

11. The method according to claim 10, wherein it further comprises a step in which a transparent plate is applied to said diffuser by bonding.

* * * * *